Nov. 22, 1927. 1,650,231
B. PARKS
RIM TOOL
Filed Aug. 12, 1926
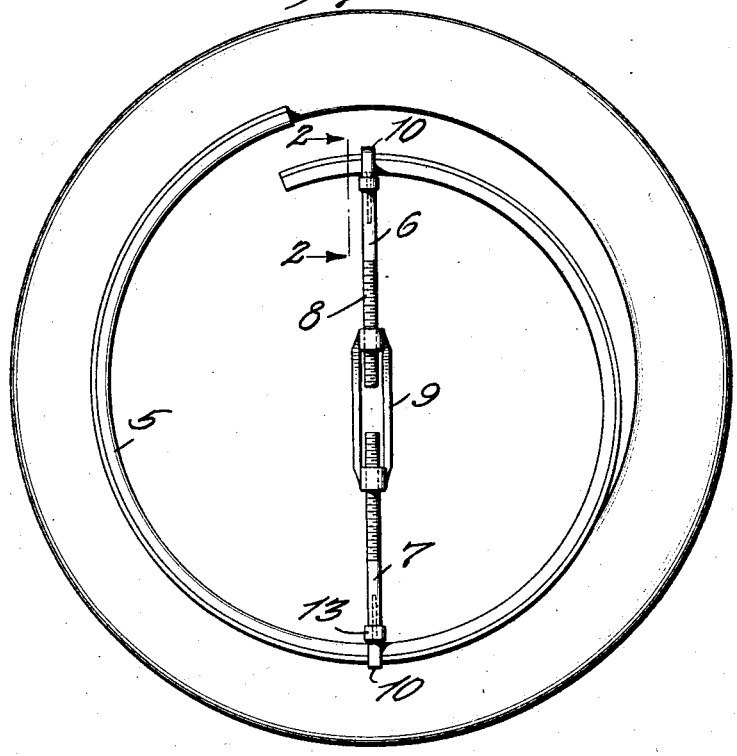
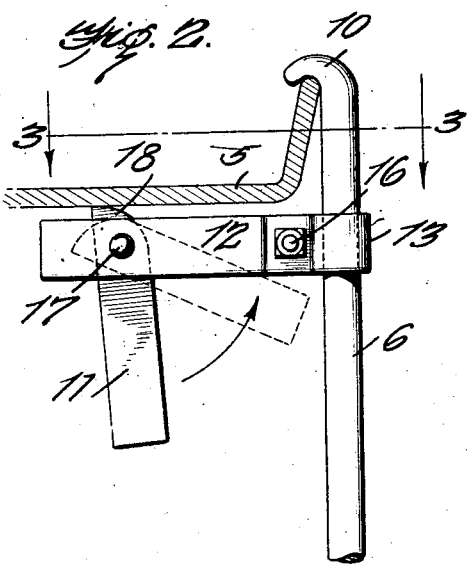
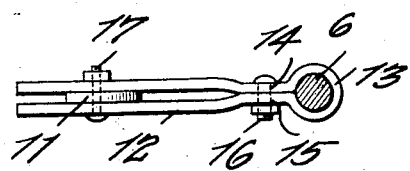
Inventor
Birney Parks Patented Nov. 22, 1927.

1,650,231

UNITED STATES PATENT OFFICE.

BIRNEY PARKS, OF PEKIN, ILLINOIS.

RIM TOOL.

Application filed August 12, 1926. Serial No. 128,805.

This invention relates to tire operating tools, and particularly to a device for collapsing or contracting and for expanding a demountable rim, and it is an object of this invention to provide novel means whereby a tire tool intended for the purpose of pulling a rim to contract it or for pushing a rim to expand it, may be held at its different positions of adjustment without liability of accidental displacement.

It is a further object of this invention to produce a tool having threaded elements connected by a turnbuckle, the outer ends of the threaded elements being shaped to form hooks which embrace the flange of a demountable rim, including means for preventing disengagement of the hooks from the flange while the rim engaging parts are being drawn together or forced apart, as in the contracting and expansion, respectively of the rim.

It is a still further object of this invention to produce a tire tool which will prove efficient and satisfactory in use, as well as comparatively inexpensive.

With the foregoing and other objects in view, the invention consists in the details of construction, and in the arrangement and combination of parts to be hereinafter more fully set forth and claimed.

In describing the invention in detail, reference will be had to the accompanyings forming part of this application wherein like characters denote corresponding parts in the several views, and in which—

Figure 1 illustrates a view in elevation of a rim showing a tool embodying the invention applied thereto;

Figure 2 illustrates a sectional view of a fragment of a rim on the line 2—2 of Fig. 1, showing a part of the tool applied thereto;

Figure 3 illustrates a sectional view on the line 3—3 of Fig 2 with the rim omitted.

In these drawings, 5 denotes a rim of conventional type which is intended to be expanded until the two free ends pass each other and abut, it being understood that usually such rims are provided with fastenings to prevent accidental displacement of the ends after they have been seated.

The tire tool embodying the invention comprises two elements 6 and 7 that may be termed "arms" and their inner ends are threaded as at 8, for engaging the threads of a turnbuckle 9. The outer end of each arm has a hook 10 which is intended to embrace or engage a flange of the demountable rim, and preferably in operation, when a demountable rim is to be pulled for the purpose of removing the tire, the tool will be applied to the rim substantially as shown in Fig. 1 where the hook of the arm 6 is located a short distance from one end of the demountable rim at the joint, so that when the pull is exerted through the manipulation of the turnbuckle, the demountable rim will be distorted. It is well known that when such demountable rims are free of a tire that one end will overlap the other and when a rim is in normal condition one end will overlap the other several inches, depending upon the diameter of the tire, etc.

In order to expand the tire, the tool is applied to the rim substantially as shown in Fig. 1, except that the hook that is nearest the joint is preferably located a slightly greater distance from the end of the rim than it is when the rim is being collapsed, as this provision permits one end of the rim to ride over the surface of the rim which it overlaps, and thus a camming action takes place, and as force is exerted, one end of the rim passes beyond the other end of the rim and the ends of the rim snap into alinement with each other, in which position they may be secured, as is ordinarily done.

As a means for preventing dislodgement of the hooked ends of the arms from the rim, a latch or clamp 11 is provided near the outer end of each arm, and the clamp, in the present embodiment of the invention, comprises a bracket 12 preferably formed of a metallic plate doubled on itself to form an eye 13 which receives an arm 6. The parallel portions of the plate forming the bracket have coinciding apertures 14 and 15 which receive a bolt 16 by which force is exerted to frictionally retain the bracket on the arm at different positions. The parallel portions of the plate beyond the fastening 16 are spaced apart to form a clearance for the reception of the latch or clamp 11 and it is mounted on a pivot 17 extending through the parallel portions of the plate. The clamp or latch has a curved edge 18 that forms a cam against the surface of the rim 5 while the parts are being adjusted, and when the elements of the device are set as shown in Fig. 2, the hook 10 is held from disengaging the rim and the operator is free ot manipulate the turnbuckle and the tire in an effort to remove the tire from the rim without liability of the tire tool becoming disengaged from the rim.

The provision for adjusting the bracket on the arm provides for properly locating the parts to accommodate rims of different dimensions. If the device were to be operated in conjunction with a rim having deeper or lower flanges the bracket could be adjusted on the arm in order that the hook 10 would engage the edge of the flange of the rim when the bracket was located in properly spaced relation to the inner surface of the rim and then the latch could be manipulated from the dotted line position to the full line position in Fig. 2, for the purpose of securing the tool in the manner stated and for the purpose intended.

I claim:

1. In a tire tool, arms having rim engaging ends, means for adjusting the arms toward and away from each other, brackets adjustably secured on the arms in spaced relation to the outer ends thereof, a pivot carried by each bracket, and a latch oscillatable on each pivot and operative to engage the surface of the rim for retaining the arms in engagement with the rim.

2. In a tire tool, arms having hooks at their ends for engaging the edges of rims, a bracket on each arm, each of said brackets comprising a plate doubled on itself to form an eye to receive an arm, means for clamping parallel portions of the plate together for binding the eye in engagement with the arm, and a latch pivotally connected to the bracket, one end of the latch having a camming surface adapted to bind against a surface of the rim and the other end of said latch constituting a handle by which the latch is manipulated.

BIRNEY PARKS.